United States Patent [19]

Waight et al.

[11] 4,072,431
[45] Feb. 7, 1978

[54] ANTIROTATION CLIP

[75] Inventors: William J. Waight, Reseda; Stanley E. Roche, Granada Hills, both of Calif.

[73] Assignee: Textron Inc., Valencia, Calif.

[21] Appl. No.: 784,895

[22] Filed: Apr. 5, 1977

[51] Int. Cl.² .......................... F16C 11/06; F16J 1/14
[52] U.S. Cl. ...................................... 403/158; 308/72; 403/149
[58] Field of Search ............. 308/72, 237 R, 30, 244; 403/158, 157, 155, 154, 149; 74/604

[56] References Cited

U.S. PATENT DOCUMENTS

| 2,064,692 | 12/1936 | Shank | 403/158 |
| 2,713,806 | 7/1955 | Dodge | 403/154 |
| 2,877,034 | 3/1959 | Crandall | 403/149 |
| 3,107,954 | 10/1963 | Rudy | 308/72 |
| 3,510,178 | 5/1970 | Sowatzke | 308/72 |

Primary Examiner—Trygve M. Blix
Assistant Examiner—Charles E. Frankfort
Attorney, Agent, or Firm—Nilsson, Robbins, Dalgarn, Berliner, Carson & Wurst

[57] ABSTRACT

Disclosed is a spring clip for attachment to an object to provide bearing surfaces thereon for engagement with a mating member. The bearing surfaces engage the mating member to preclude or limit rotation of the object in a predetermined axis while allowing a self-aligning bearing contained in the object to properly position itself to receive the mating member.

6 Claims, 5 Drawing Figures

4,072,431

ANTIROTATION CLIP

BACKGROUND OF THE INVENTION

In the transmission of forces such as the utilization of hydraulic actuators, it is often required to provide proper alignment between two objects such as an actuator and a control surface. In so doing, the alignment is accomplished by a self-aligning bearing inserted into an end of the actuator, adapted for coupling to the control surface. Typically, the end of the actuator is screw threaded so that it may be positioned to fit within a clevis-type of fixture on the control surface. When the end of the actuator and the clevis are interconnected, it is desired to limit the rotation of the end of the actuator within the clevis to preclude undue vibration or oscillation of the actuator appartus. Sufficient clearance, however, is necessary to permit the self-aligning bearing to position itself properly with respect to the clevis.

To accomplish the foregoing, it has been customary in the prior art to specially machine the end of the actuator to provide bearing surfaces integrally formed therewith. The bearing surfaces engage the clevis thereby limiting the rotation of the end of the actuator once it is positioned. Such special machining, although providing a part which functions extremely well, is extremely expensive and requires a special part for each application, thus increasing engineering and design expenses in addition to the large cost for the manufacture of the special part.

SUMMARY OF THE INVENTION

In accordance with the present invention there is provided a spring clip adapted for attachment to an object thereby to provide bearing surfaces to be received within a mating member thereby to limit rotation of the object. The clip is constructed of a unitary U-shaped member having first and second arms upon which are formed tabs which are inwardly directed thereby to provide outer bearing surfaces on opposed sides of the object.

DESCRIPTION OF THE PREFERRED EMBODIMENT

Figure 1:
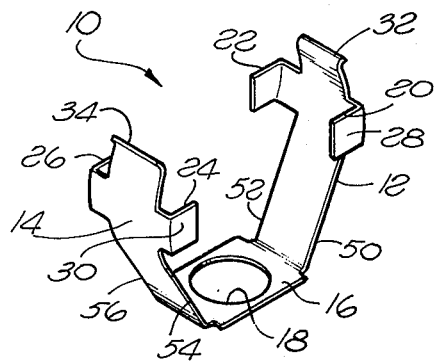
FIG. 1 is a perspective view of the clip of the present invention.

As is illustrated in FIG. 1, a clip constructed in accordance with the present invention includes a unitary U-shaped member having a first arm 12 and a second arm 14 interconnected by a bight portion 16. The bight portion 16 defines an opening 18 therethrough which may receive a portion of the object upon which the clip 10 is affixed as will become more fully apparent hereinafter. The first arm 12 includes first and second tabs 20 and 22 extending inwardly therefrom. The second arm 14 includes third and fourth tabs 24 and 26 extending inwardly therefrom. Each of the tabs defines an outer surface such as that shown at 28 and 30 on the tabs 20 and 30, respectively. The outer surfaces of the tabs function as bearing surfaces as will be more fully described hereinbelow. The arms 12 and 14 at the terminal ends thereof are curved outwardly as illustrated at 32 and 34, respectively. Such curvature enables the clip to be easily inserted over the object to which it is to be affixed.

It will be noted that the clip as illustrated in FIG. 1 is constructed from spring steel and may be stamped or otherwise formed. The clip is integral and thus relatively inexpensive to fabricate.

Figure 2:
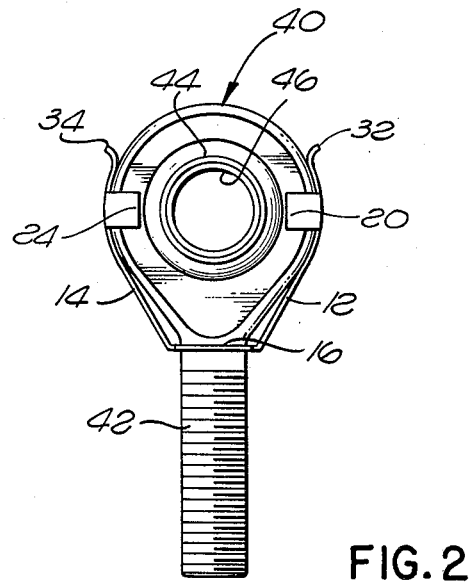
FIG. 2 is a front elevational view of a piston rod end having the clip constructed in accordance with the present invention fitted thereon.
Figure 3:
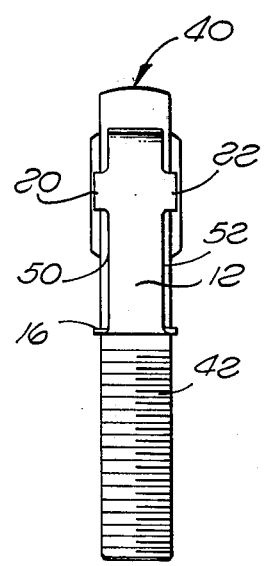
FIG. 3 is a side elevational view of the structure of FIG. 2.
Figure 4:
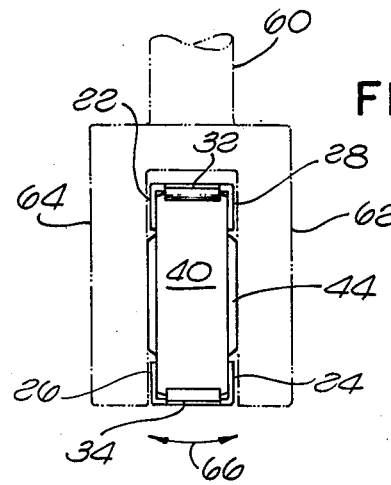
FIG. 4 is an end elevational view of the structure of FIG. 2.

As is illustrated in FIGS. 2, 3 and 4, the clip 10 may be easily snapped upon an object as required to provide the desired bearing surfaces. For example, as is illustrated in FIG. 2, there is provided a piston rod end 40 which has a screw threaded end 42 that is utilized to thread the end 40 into position on the piston rod. By the use of threads, the rod end 40 has some adjustment as may be needed in any particular application. The rod end 40 includes a self-aligning bearing 44 secured therein. The bearing defines an opening 46 through which a securing member such as a pin may be inserted. Such pin allows the piston rod to be secured to a clevis or similar device which may be affixed to an object which is to be moved by the actuator piston rod, such for example, as a control surface or the like on aircraft. Such a structure is illustrated in phantom in FIG. 4. As is therein shown, the clevis structure 60 has a pair of arms 62 and 64 which engage the outer surfaces of the self-aligning bearing 44. It will be noted that the distance between the outer surfaces of the self-aligning bearing 44 is slightly greater than the distance between the outer surfaces of the bearings provided by the clip. In this manner, sufficient room is provided for the self-aligning bearing 44 to correct for any misalignment that might exist between the clevis 60 and the rod end 40. However, the outer bearing surfaces provided by the clip will engage the inner surfaces of the arm 62 and 64 of the clevis 60, thereby limiting the amount of rotational movement (as indicated by the arrow 66) which will be permitted to the rod end 40.

As more particularly shown in FIGS. 1 and 3 the arms 12 and 14 of the clip are reduced in width as shown at 50–56 with respect to the bight portion 16. Such width reduction serves the purpose of weight reduction and also reduces the possibility of the clip arms being accidentally caught by a foreign object and thus dislodged from the rod end 40.

As will be noted, particularly in FIGS. 2 and 3, the threaded end 42 of the rod end 40 is disposed within the opening 18 defined in the bight 16. Thus, the clip is held in place not only by the spring characteristics of the clip arms 12 and 14 but also by the appropriate lock nuts which are normally disposed upon the threaded end 42 of the rod end 40.

Figure 5:
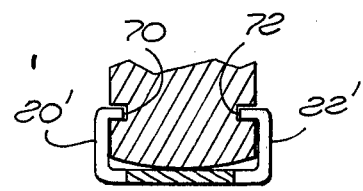
FIG. 5 is a fragmentary view illustrating a specific feature of the clip constructed in accordance with one feature of the present invention.

By reference to FIG. 5, it will be noted that tabs 20' and 22' may be formed with an additional inwardly directed or re-entrant terminal portion 70 and 72. The terminal portion 70 and 72 are adapted to fit within indentations provided in the surface of the rod end 40 thereby further securing the clip in place upon the rod end 40 should such be desired.

It will be understood by those skilled in the art that the clip may be formed in such a fashion that the opening 18 is eliminated in the bight and that the bight as opposed to being flat as illustrated at 16, may be curved and under these circumstances, the clip may be snapped into place over the opposite end of the rod end from that illustrated in FIG. 2. Such a structure would be particularly adapted for clips formed as illustrated in FIG. 5 with the inner portions of the tabs adapted to fit within openings on the rod end to thereby position and secure the clip in place.

It will be noted that the bearing surfaces are located at the center axis of the opening 46 in the self-aligning bearing. Such appropriately positions the bearing surfaces for proper and full cooperation with the clevis or other cooperating part to which the rod end or similar device is affixed in the normal application.

What is claimed is:

1. An anti-rotation spring clip adapted for attachment to an object to prevent rotation thereof in a predetermined axis, said clip comprising:
   a unitary U-shaped member having first and second arms interconnected by a bight portion;
   said first arm having first and second spaced apart opposed inwardly directed tabs thereon;
   said second arm having third and fourth spaced apart opposed inwardly directed tabs thereon; and
   said tabs each having an outer bearing surface.

2. An anti-rotation clip as defined in claim 1 wherein said first and second arms are outwardly flared at the terminal ends thereof to facilitate insertion of said object therein.

3. An anti-rotation clip as defined in claim 2 wherein said first and second tabs are disposed intermediate the ends of said first arm and said third and fourth tabs are disposed intermediate the ends of said second arm.

4. An anti-rotation clip as defined in claim 3 wherein said tabs each include a re-entrant terminal portion.

5. An anti-rotation clip as defined in claim 3 wherein said bight portion is substantially flat and defines an opening therethrough.

6. An anti-rotation clip as defined in claim 5 wherein each of said arms has a width less than the width of said bight portion.

* * * * *